United States Patent
Iura

[11] 3,852,778
[45] Dec. 3, 1974

[54] SINGLE LENS REFLEX CAMERA OF TTL PHOTOMETRY TYPE

[75] Inventor: Yukio Iura, Kawasaki, Japan

[73] Assignee: Canon Kabushiki Kaisha, Tokyo, Japan

[22] Filed: Nov. 13, 1972

[21] Appl. No.: 306,038

Related U.S. Application Data
[63] Continuation of Ser. No. 98,552, Dec. 16, 1970, abandoned.

[30] Foreign Application Priority Data
Dec. 19, 1969  Japan.............................. 44-105446

[52] U.S. Cl...................... 354/51, 354/24, 354/239
[51] Int. Cl. ............................................. G03b 7/08
[58] Field of Search......... 95/10 CT, 10 CE, 10 CD; 354/51, 24, 239

[56] References Cited
UNITED STATES PATENTS

| | | |
|---|---|---|
| 3,533,348 | 10/1970 | Yanagi.............................. 95/10 CT |
| 3,623,410 | 11/1971 | Mita ................................. 95/10 CT |
| 3,678,822 | 7/1972 | Veda et al. ........................ 95/10 CT |
| 3,691,917 | 9/1972 | Uchida et al. ..................... 95/10 CT |
| 3,695,159 | 10/1972 | Mita ................................. 95/10 CT |

Primary Examiner—Samuel S. Matthews
Assistant Examiner—Russell E. Adams, Jr.
Attorney, Agent, or Firm—Toren, McGeady and Stanger

[57] ABSTRACT

In the apparatus disclosed, a photosensitive element is exposed to light through an objective lens. A switch passes information from the element to a storage capacitor while the camera shutter is closed. A diaphragm driver drives an automatic diaphragm toward a preset position. The driver actuates the switch when the diaphragm reaches the preset value. A shutter control responds to the charge on the capacitor to initiate an exposure and terminate the exposure. The photosensitive element remains unexposed to light through the objective lens while a single lens reflex mirror blocks the light path to the element as the shutter is opened.

11 Claims, 6 Drawing Figures

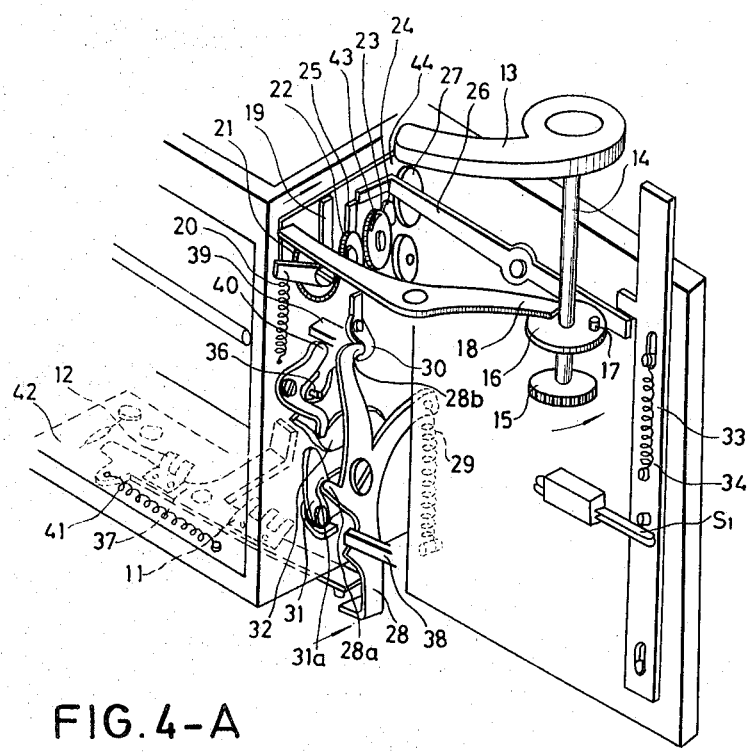
FIG. 3
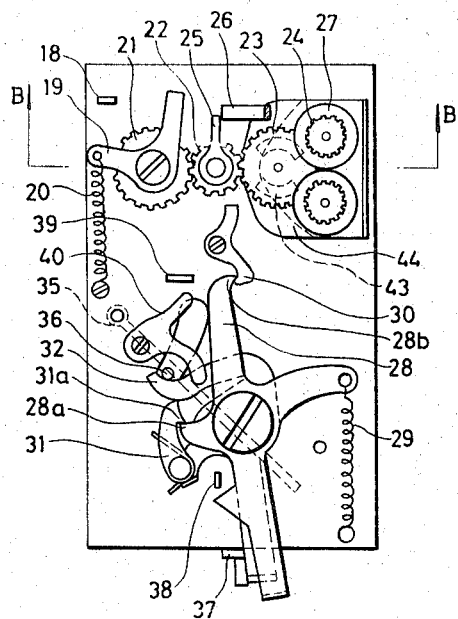
FIG. 4-A
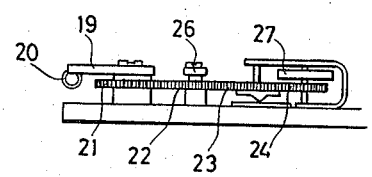
FIG. 4-B

SINGLE LENS REFLEX CAMERA OF TTL PHOTOMETRY TYPE

This is a continuation of application Ser. No. 98,552, filed on Dec. 16, 1970, now abandoned.

The present invention relates to a camera system which can be extremely effectively applied to a single lens reflex camera having an electronic shutter control of TTL (through the taking-lens) photometry or memory type.

As disclosed in Japanese Patent Publication No. 19747/69, now Japanese Patent No. 565,941, a camera having an electrically controlled shutter is already known, in which the photometric element of a single lens reflex camera of TTL photometry type is switched, upon taking a picture, from a first or photometric state to a second or non-photometric state, and during the second or non-photometric state, a shutter member is controllably driven in response to a value which is stored in a memory device of a photographing information such as the illuminence during the first or photometric state of an object being photographed, and which is retained by the memory device at the commencement of the switching process, and in which an arrangement is made so that the photometric element is reset to the first state after the intended picture has been taken.

The present invention is directed to an improvement of a camera having such electrically controlled shutter, and resides in a camera system which achieves at least one of the following objects and features:

1. An arrangement is made to the photometric value from the memory during the resetting process, with a change-over means which is maintainable of the retention by memory of the previously memorized photographing condition as required;

2. A resilient contact member integral with but electrically insulated from a reciprocating member is provided to effect a reciprocating movement of the reciprocating member relative to fixed contacts in order to provide connection and disconnection therebetween for the switching action from the first state to the second state, and in order to simplify the switch mechanism also, thereby rendering it possible to meet with the recent demand for integrated circuit technique, and 3. A delay unit is provided which is started by operation of a shutter button, and the memory operation is caused to initiate during the operation of the delay unit, with the reflex mirror, automatic diaphragm device and the like becoming movable upon completion of the memory operation to assure the memory of the amount of light available to the photographing, and to minimize current drain from a supply battery.

The above and other objects, features and advantages of the present invention will be more fully described below with reference to several embodiments thereof shown in the attached drawings wherein:

FIG. 3 is a fragmentary perspective view of a camera equipped with an electrically controlled shutter constructed in accordance with the present invention.

FIG. 4A is a front view of the camera part shown in FIG. 3, showing the parts in position when the mirror is in its lower position.

FIG. 4B is a cross-section along the line B—B shown in FIG. 4A, but when the mirror is in its upper position.

Figure 1:
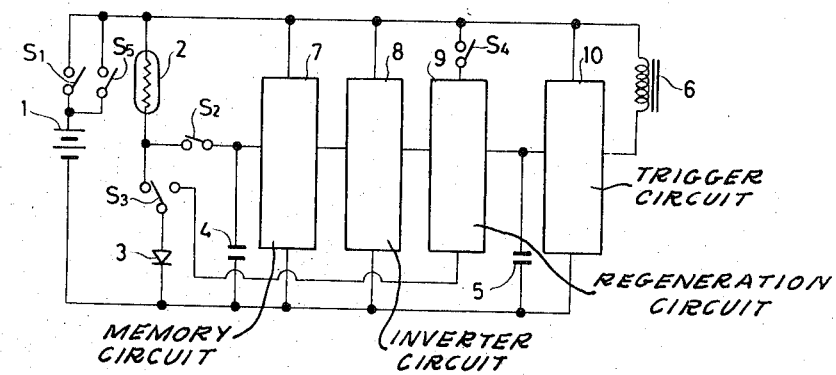
FIG. 1 is electrical and block diagram of an electrically controlled shutter to which the present invention may be applied.

Although FIG. 1 shows an electrical block diagram of an electrically controlled shutter to which the invention is applicable, other circuits as exemplified by Japanese Patent Publication No. 19747/69, now Japanese Patent No. 565,941 may be used. In FIG. 1, denotes a supply battery, 2 a photoconductor element, 3 a log-diode, 4 a memory capacitor, 5 a timer capacitor for determining the shutter speed, 6 an electromagnet for controlling the shutter closure, 7 a memory circuit, 8 an inventer circuit, 9 a regeneration circuit, and 10 a trigger circuit. $S_1$ denotes a power switch, $S_2$ a memory switch, $S_3$ a change-over switch having photometry and regeneration positions, $S_4$ a starter switch interlocked with the initiation of running of the first curtain of the shutter, and $S_5$ a switch connected in parallel with the switch $S_1$. The switch $S_5$ may be commonly used to provide a preview of the photometry condition by its previous closure. In this instance, portions of the memory circuit, the regeneration circuit or the photometry circuit which normally remain conductive may conveniently be provided with an indicator means such as an ammeter or an indicator lamp.

Figure 2:
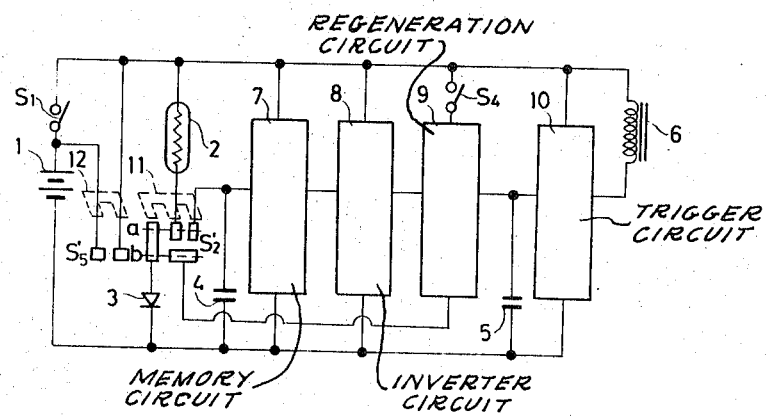
FIG. 2 is electrical an block diagram of an example of a modification having a modified switch portion.

FIG. 2 is an electrical block diagram of a modification which is essentially similar to FIG. 1, but in which the switches $S_2$, $S_3$ and $S_5$ are operable in complete synchronism with each other. In this modification, 11 and 12 denote resilient contact members integral with respective reciprocating members but electrically insulated therefrom. Reference characters $S_2'$ and $S_5'$ denote fixed contacts. In particular, $S_2'$ provides a complete synchronism of the switching action of $S_2$ with that of $S_3$. Connection of the portions denoted by letter $a$ with one another corresponds to closure of $S_2$ and the connection of $S_3$ with the terminal of the photometry circuit in FIG. 1. On the other hand, connection of the portions denoted by letter $b$ with one another corresponds to the open circuit condition of $S_2$ and the connection of $S_3$ with the terminal of the regeneration circuit 9 in FIG. 1. Contact $S_5'$ co-operates with the member 12 to function as a switch $S_5$.

Figure 5:
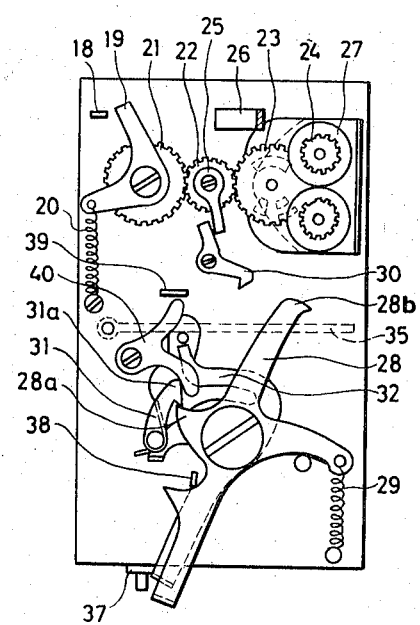

FIG. 3 is a perspective view of the principal parts of a camera having an electrically controlled shutter according to the present invention. In this Figure, the reference character $S_1$ denotes the power switch mentioned above, 11 and 12 the resilient contact members, 13 a film winding lever, and 14 a winding shaft. A drive gear which serves for operations such as shutter charging, film winding, charging of an automatic diaphragm device to the fully opened state, charging of a mirror driving lever. The drive gear 15 operates in a conventional manner using conventional mechanism, not shown. A cam disc 16 integral with the winding shaft 14 has a pin 17 formed thereon. The pin 17 rotates a rocking lever 18 clockwise during the counterclockwise winding process of the winding lever 13. The other end of the rocking lever 18 rotates a forked lever 19 clockwise against the force of a spring 20, thereby energizing the forked lever 19. As shown in FIGS. 4A, 4B and 5 since reference thereto will facilitate the understanding. The rocking lever 18 and the forked lever 19 are located in front of a gear 21 and gear trains 21 and gear trains 22, 23 and 24. In front of the gear 22 are located a clamping lever 25 and a rocking lever 26. When the forked lever 19 is energized, the gears 22 to 24 are rotated, and after the clamping lever 25 moves past the bent end of the rocking lever 26, the clamping lever 25 is set in place. This condition is shown in FIG. 4A. A flywheel 27 on the front surface of the gear 24 forms a mechanical delay unit to provide a memory time in excess of a certain length of time.

An intermediate lever is biased clockwise by a spring 29: A setting lever 30 holds the intermediate lever 28 in its energized condition. Element 31 is a locking lever, and 32 a reflex mirror driving lever. In the winding process of the winding lever 13, the intermediate lever 28 is rotated counter-clockwise against the force of the spring 29 and is held in its set position by the setting lever 30 which engages a detent 28b of the intermediate lever 28. Also, a locking projection 28a of the intermediate lever 28 engages a detent 31a of the locking lever 31, with result that the reflex mirror driving lever 32 is locked in place by the locking lever 31. This condition is shown in FIG. 4A. As shown in FIG. 3 a shutter release lever 33 is urged upwardly by a spring 34, and 34 a spring which urges this.

In operation, when the shutter release lever 33 is depressed against the force of the spring 34, the switch $S_1$ is initially closed to cause the circuit to measure the illuminence of an object being photographed. It is desirable to keep the shutter button or the shutter release lever depressed, and preferably the switch $S_1$ is held in its closed position either mechanically or electromagnetically with a switch which corresponds to $S_5$ in FIG. 1.

Depression of the shutter release lever 33 causes the rocking lever 26 to be further rotated clockwise, as viewed in FIG. 4, thereby releasing the clamping lever 25 from engagement therewith, and allowing the mechanical delay unit to initiate its operation. Such arrangement permits the use of a relatively weak spring 20 for the operation involved, as compared with spring 29 that has heretofore been used for the automatic diaphragm. In addition, the stroke of the shutter release lever or shutter button can be reduced, with consequence that the force to be applied to the shutter button may be reduced, thereby advantageously preventing the adverse influences of blurring caused by sudden motions of the camera.

After lapse of a certain given time through the delay unit, the clamping lever 25 has gone through substantially one-half revolution clockwise into abutting relationship with the setting lever 30, which is therefore rotated counter-clockwise to release its engagement with the detent 28b of the intermediate lever 28, which then rotates clockwise. The locking projection 28a and the dentent 31a remain in locking engagement. Because of the pivotal connection of the locking lever 31 on the mirror driving lever 32 and the common support for the intermediate lever 28 and the mirror driving lever 32, the members 31 and 32 rotate integrally with the member 28. The reflex mirror is thus moved to its upper position.

A reflex mirror 35 is pivotally mounted so as to be rockable. A pin 36 is integral with the mirror 35. The mirror 35 is clockwise urged about its pivot by a spring not shown. The upward movement of the mirror 35 is effected by an upward drive imparted to the pin 36 by the mirror driving lever 32. Numeral 37 denotes an automatic diaphram driving lever, and 38 a shutter clamping lever. The automatic diaphragm driving lever 37 is rotated clockwise by the intermediate lever 28 simultaneously with the upward movement of the mirror 35, thereby controlling the aperture of the diaphragm device. Also, at this time, the clockwise rotation of the intermediate lever 28 causes the shutter clamping lever 38 to release the first curtain of the shutter for allowing the running thereof, whereby the shutter is opened. The second curtain of the shutter, not shown, is maintained in a position before its running by an electromagnet as conventional. This condition is shown in FIG. 5.

Numeral 39 denotes a mirror-up release lever, 40 a forked lever, and 41 a coiled spring which urges the automatic diaphragm driving lever counter-clockwise.

Upon completion of the exposure by controlling the movement of the second curtain with the circuit means shown in FIG. 1 or 2, the mirror-up release lever 39 is moved in response to an exposure completion signal, thereby rotating the forked lever 40 clockwise. Then, the locking lever 31 is rotated counter-clockwise by the forked lever 40 to release the locking engagement between the detent 31a and the intermediate lever 28. As a result the integral interengagement among the intermediate lever 28 locking lever 31 and the mirror driving lever 32 is released. The mirror driving lever 32 being is rotated counter-clockwise from the position shown in FIG. 5 by the action of the coiled spring 41 which urges the automatic diaphragm driving lever 37. Thus the mirror 35 returns to its original 45° position. At this time, the automatic diaphragm driving lever 37 allows the automatic diaphragm device, not shown, to return to its fully opened position.

Numerals 11 and 12 denote resilient contact members integral with but electrically insulated from the automatic diaphragm driving lever 37, and 42 a circuit assembly implemented as a printed board, micro-module or integrated circuit. If the circuit assembly 42 is provided with contacts $S_2'$ and $S_5'$ integrally therewith, the synchronism of the operation of the switches, for example, those shown in the circuit of FIG. 2, is conveniently assured.

In this case, the conduction of the contacts $S_2'$ and $S_5'$ which are integral with the circuit assembly 42 can be changed over by sliding movement of the contact members 11 and 12 which are integral with the automatic diaphragm driving lever 37, thereby reducing space and cost requirements as compared with the prior art device, and also rendering it possible to manufacture on a mass production basis. Contact members 43 similar to the contact members 11 and 12 may be located behind the gear 23 to provide a switching action with a circuit assembly 44, similar to that of the circuit assembly 42.

As mentioned above, the invention provides an arrangement to release the retention by memory of the photometric value in the resetting or returning process, so that the camera is always ready to take another picture. In particular, by an arrangement such that the power switch is closed at the first position of the switching means by interlocking movement with the depression of the shutter button, maintained closed and returned to its open position at the second position of the switching means, the retention by memory of the photometric value is released during the resetting process after a picture has been taken, so that the camera is always ready to take another picture, and the rise time of the circuit which is required when the power switch is initially closed by operation of the shutter button and maintained thereby is substantially eliminated. In addition, the opening of the power switch with the resetting of the switching means reduces current drain from the power supply. If required, a switching means which causes the retention by memory of the previous photographing condition to be maintained may be provided to eliminate any period of time that is required for memory operation.

Various members may be utilized as such switching means, such as means arranged on the outer periphery of a shutter button having a spare operative angle, self-timer setting member, the mount for interchangeable lenses, the connection between a grip and a camera, the connection between a flushlight unit and a camera body, lens changing ring, winding lever or the like.

In view of the recent tendency for incorporating integrated circuit technique, the synchronization of switching devices according to the invention may be advantageously applied at this end, with an additional advantage of removing the need for lead wire connection. The switching device portion is simple in construction, as compared with the prior art, thereby increasing the durability. In addition, it is free from wear of contacts or contact blade and poor insulation caused by oxidation, and assures a strong urging pressure.

Where the illuminence of an object being photographed low, the light sensitive element will present a high resistance, which requires a long period of time for memory operation, thereby resulting in an inaccuracy or variation (for example, as great as 20 seconds) due to the shortage of memory time. Such failure is prevented by operating the mechanical delay unit with the operation of the shutter release button so that the mirror is raised after a given time or upon completion of the memory operation. In this manner, the result of photographing is improved and the life of the supply battery can be substantially extended.

What is claimed is:

1. A through-the-lens light measuring and exposure control apparatus for a single lens reflex camera having an objective lens, comprising a photosensitive element exposed to light through the objective lens and having a delayed time response characteristic which produces a time delay, shutter means, an information storage capacitor, openable and closable switching means selectively connecting said capacitor to said element for inserting information from said element into said storage capacitor, a view finder including a movable reflector, normally open automatic diaphragm means, diaphragm driving means for driving said diaphragm means to a predetermined aperture, operation initiating means coupled to said driving means for initiating operation of said driving means and coupled to said switching means for closing said switching means, said driving means operating independently of said initiating means after the operation of said driving means is initiated and said driving means being engaged with said switching means to open said switching means and said shutter means when said diaphragm reaches its predetermined aperture, control means responsive to said capacitor for closing said shutter means in accordance with the information in said capacitor, and actuating means coupled to said driving means and said movable reflector for moving said movable reflector so as to block the light path to said element when said shutter means has been opened; said driving means including delay means for delaying the driving action, for a predetermined time longer than the time delay produced by the delayed time response characteristic, after said initiating means closes said switching means to allow the capacitor to store information from said element.

2. A light measuring and exposure control apparatus for a single lens reflex camera having an objective lens, comprising photoelectric storage means for responding to light and accumulating and storing information corresponding to light being measured and having a delayed time response characteristic which produces a time delay, operation initiating means coupled to said storage means for causing said storage means to start accumulating information, shutter means, diaphragm means, driving means having an operation initiated by said initiating means for closing the diaphragm to a predetermined aperture and coupled to said storage means for ending the accumulation of information, said driving means opening said shutter means, control means responsive to the information in said storage means and coupled to said shutter means for closing said shutter means on the basis of the stored information; and delay means in said driving means for delaying the end of accumulation of information by said storage means, for a predetermined time longer than the time delay produced by the delayed time response characteristic, until a minimum amount of information has been accumulated; the delay of said delay means being independent of the operation of said initiating means.

3. An apparatus as in claim 2, wherein said driving means is independent of the operation of said initiating means after said initiating means has initiated the operation of said driving means.

4. A through-the-lens light measuring and exposure control apparatus for a single lens reflex camera having an objective lens, comprising a photosensitive element exposed to light through the objective lens, shutter means, an information storage capacitor, openable and closable switching means selectively connecting said capacitor to said element for inserting information from said element into said storage capacitor, a view finder including a movable reflector, normally open automatic diaphragm means, diaphragm driving means for driving said diaphragm means to a predetermined aperture, operation initiating means coupled to said driving means for initiating operation of said driving means and coupled to said switching means for closing said switching means, said driving means operating independently of said initiating means after the operation of said driving means is initiated and said driving means being engaged with said switching means to open said switching means and said shutter means when said diaphragm reaches its predetermined aperture, control means responsive to said capacitor for closing said shutter means in accordance with the information in said capacitor, and actuating means coupled to said driving means and said movable reflector for moving said movable reflector so as to block the light path to said element when said shutter means has been opened, said driving means including delay means for delaying the driving action after said initiating means closes said switching means to allow the capacitor to store information from said element, said delay means including a mechanical governor.

5. A camera, comprising an objective lens, shutter means in the path of light passing through said objective lens, a single lens reflex viewing system having a pivotable mirror, a shutter button, photoelectric storage means coupled to said shutter button for responding to light and accumulating and storing information corresponding to light being measured after actuation by said shutter button and having a delayed time response characteristic which produces a time delay, driving means having an operation initiated by said initiating means for moving said pivotable mirror out of the path of light from said objective lens and coupled to said storage means for ending accumulation of information, said driving means opening said shutter means, control means responsive to the information in said storage means and coupled to said shutter means for closing said shutter means on the basis of the stored information; and delay means in said driving means for delaying the end of the accumulation of information by said storage means, for a predetermined time longer than the time delay produced by the delayed time response characteristic, until a minimum amount of information has been accumulated; the delay of said delay means being independent of the operation of said initiating means after said initiating means has initiated operation of said driving means.

6. A camera as in claim 5, further comprising diaphragm means, said driving means closing the diaphragm means to a predetermined aperture.

7. A camera as in claim 5, wherein the operation of said driving means is independent of the operation of the shutter button after the shutter button has initiated operation of said driving means.

8. A camera as in claim 5, wherein wind-up means sets said driving means and a lock holds said driving means in the set position, said driving means including energy storage means in which said wind-up means stores energy, said shutter release button actuating said lock to release said driving means from the set position so that said energy storage means can drive said winding means.

9. A camera, comprising an objective lens, shutter means in the path of light passing through said objective lens, a single lens reflex viewing system having a pivotable mirror, a shutter button, photoelectric storage means coupled to said shutter button for responding to light and accumulating and storing information corresponding to light being measured after actuation by said shutter button, driving means having an operation initiated by said initiating means for moving said pivotable mirror out of the path of light from said objective lens and coupled to said storage means for ending accumulation of information, said driving means opening said shutter means, control means responsive to the information in said storage means on the basis of the stored information, and delay means in said driving means for delaying the end of the accumulation of information by said storage means until a minimum amount of information has been accumulated, the delay of said delay means being independent of the operation of said initiating means after said initiating means has initiated operation of said driving means the operation of said driving means being independent of the operation of said shutter button after the shutter button has initiated operation of said driving means, said delay means including a mechanical governor.

10. A camera as in claim 9, wherein said driving means includes a projection responsive to the operation of the governor and movable in response to initiation by the shutter button from one position to a second position in which it actuates operation of the mirror at a rate determined by the governor.

11. A camera as in claim 9, wherein wind-up means sets said driving means and a lock holds said driving means in the set position, said driving means including energy storage means in which said wind-up means stores energy, said shutter release button actuating said lock to release said driving means from the set position so that said energy storage means can drive said winding means.

* * * * *